US012729307B2

(12) United States Patent
Kugel et al.

(10) Patent No.: US 12,729,307 B2
(45) Date of Patent: Sep. 8, 2026

(54) THERMAL DEBONDING OF PRIMER-INITIATED CURABLE STRUCTURAL ADHESIVE FILMS

(71) Applicant: 3M INNOVATIVE PROPERTIES COMPANY, St. Paul, MN (US)

(72) Inventors: Alexander J. Kugel, Woodbury, MN (US); Dean A. Miner, Prescott, WI (US); Matthew T. Holbrook, Little Canada, MN (US); Nicholas W. Lang, Minnetonka, MN (US); Kristen L. Bellmer, Cottage Grove, MN (US); Scott M. Spear, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 591 days.

(21) Appl. No.: 17/802,839

(22) PCT Filed: Mar. 3, 2021

(86) PCT No.: PCT/IB2021/051782

§ 371 (c)(1),
(2) Date: Aug. 26, 2022

(87) PCT Pub. No.: WO2021/176376

PCT Pub. Date: Sep. 10, 2021

(65) Prior Publication Data

US 2023/0088278 A1 Mar. 23, 2023

Related U.S. Application Data

(60) Provisional application No. 62/986,316, filed on Mar. 6, 2020.

(51) Int. Cl.

*C09D 5/00* (2006.01)
*B32B 43/00* (2006.01)
*C09D 133/08* (2006.01)
*C09J 5/06* (2006.01)

(52) U.S. Cl.

CPC ............ *C09D 5/002* (2013.01); *B32B 43/006* (2013.01); *C09D 133/08* (2013.01); *C09J 5/06* (2013.01); *B32B 2309/02* (2013.01)

(58) Field of Classification Search

CPC .... C09D 5/002; C09D 133/08; B32B 43/006; B32B 2309/02; C09J 5/06; C09J 2301/408; C09J 2301/502; C09J 2433/00; C08K 5/19; Y02P 20/582

See application file for complete search history.

(56) References Cited

U.S. PATENT DOCUMENTS

| | | | |
|---|---|---|---|
| RE24,906 | E | 12/1960 | Ulrich |
| 3,625,875 | A | 12/1971 | Frauenglass et al. |
| 3,639,500 | A | 2/1972 | Muny et al. |
| 3,994,764 | A | 11/1976 | Wolinski |
| 3,996,308 | A | 12/1976 | Douek et al. |
| 4,074,004 | A | 2/1978 | Bateson |
| 4,170,612 | A | 10/1979 | Pastor et al. |
| 4,316,000 | A | 2/1982 | Boeder |
| 4,373,077 | A | 2/1983 | Boeder |
| 4,452,955 | A | 6/1984 | Boeder |
| 4,472,231 | A | 9/1984 | Jenkins |
| 4,569,976 | A | 2/1986 | Zimmerman et al. |
| 4,945,006 | A | 7/1990 | Muggee et al. |
| 4,946,529 | A | 8/1990 | Huddleston |
| 5,003,016 | A | 3/1991 | Boeder |
| 5,106,808 | A | 4/1992 | Boeder |
| 5,314,748 | A | 5/1994 | Mazurek et al. |
| 6,734,249 | B1 | 5/2004 | Bulluck et al. |
| 7,014,790 | B1 | 3/2006 | Bulluck |
| 7,635,516 | B2 | 12/2009 | Arimitsu et al. |
| 9,102,774 | B2 | 8/2015 | Clapper et al. |
| 9,815,259 | B2 | 11/2017 | Krogdahl |
| 10,307,985 | B2 | 6/2019 | Sherman et al. |

(Continued)

FOREIGN PATENT DOCUMENTS

| | | | |
|---|---|---|---|
| CA | 1301616 | C | 5/1992 |
| CN | 104497892 | | 4/2015 |
| DE | 10259457 | B4 | 1/2010 |
| DE | 102015009764 | | 2/2017 |
| EP | 0232936 | A2 | 8/1987 |
| EP | 0140006 | B2 | 7/1995 |
| EP | 0527505 | B1 | 12/1998 |
| EP | 0889105 | A2 | 1/1999 |
| EP | 1611217 | B1 | 8/2007 |
| EP | 1800865 | B2 | 2/2013 |
| GB | 1448257 | A | 9/1976 |
| GB | 2121811 | | 1/1984 |
| GB | 2448257 | | 10/2008 |
| JP | 6026079 | A | 5/1981 |
| JP | 58171462 | | 10/1983 |
| JP | 63-184744 | | 7/1988 |

(Continued)

OTHER PUBLICATIONS

International Search Report for PCT International Application No. PCT/IB2021/051782, mailed on Apr. 16, 2021, 4 pages.

*Primary Examiner* — George R Koch
*Assistant Examiner* — Christopher C Caillouet
(74) *Attorney, Agent, or Firm* — Kathleen B. Gross

(57) ABSTRACT

Debonding methods comprise: providing a bound article comprising, in order: a first adherend, a first primer layer, an adhesive layer, optionally a second primer layer, and a second adherend; heating the article to a release temperature; and separating the first and second adherends. At room temperature, the adhesive layer exhibits a high overlap shear of greater than 1.0 MPa (145 psi) or even greater than 5.0 MPa (725 psi), however, at release temperature, the adhesive layer exhibits an overlap shear of no more than 0.34 MPa (50 psi) or even no more than 0.21 MPa (30 psi). The release temperature may be a temperature between 100° C. and 150° C. The adhesive layer may comprise: a first film-forming polymer or oligomer; a cured polymer comprising a polymer of a first species comprising first unsaturated free-radically polymerizable groups; a first transition metal cation; and optionally a quaternary ammonium salt.

20 Claims, No Drawings

(56) References Cited

U.S. PATENT DOCUMENTS

| | | | | |
|---|---|---|---|---|
| 10,723,918 | B2 | 7/2020 | Chien | |
| 11,370,940 | B2 | 6/2022 | Townsend | |
| 12,098,314 | B2 | 9/2024 | Ranade | |
| 2004/0228998 | A1 | 11/2004 | Haas | |
| 2005/0214497 | A1 | 9/2005 | Bilodeau | |
| 2005/0230960 | A1 | 10/2005 | Bilodeau et al. | |
| 2008/0196822 | A1 | 8/2008 | Satoh | |
| 2008/0242764 | A1 | 10/2008 | Wallace et al. | |
| 2009/0084983 | A1* | 4/2009 | Simandl | B26F 3/06 250/492.1 |
| 2010/0061823 | A1 | 3/2010 | Attarwala et al. | |
| 2010/0075129 | A1 | 3/2010 | Nagasaki et al. | |
| 2010/0255239 | A1 | 10/2010 | Hammond et al. | |
| 2010/0273008 | A1* | 10/2010 | Burckhardt | C09J 5/00 156/247 |
| 2012/0034447 | A1 | 2/2012 | Higuchi et al. | |
| 2013/0052460 | A1 | 2/2013 | Iseki et al. | |
| 2013/0184394 | A1 | 7/2013 | Satrijo et al. | |
| 2014/0138013 | A1 | 5/2014 | Attarwala | |
| 2015/0299521 | A1 | 10/2015 | Bossaert et al. | |
| 2016/0108287 | A1 | 4/2016 | Schümann | |
| 2016/0108292 | A1 | 4/2016 | Yamakami | |
| 2016/0289513 | A1 | 10/2016 | Behling et al. | |
| 2017/0066947 | A1 | 3/2017 | Dietze | |
| 2017/0246660 | A1 | 8/2017 | Thompson | |
| 2018/0215955 | A1 | 8/2018 | Claret | |
| 2018/0237585 | A1 | 8/2018 | Liu | |
| 2018/0311113 | A1 | 11/2018 | Moser | |
| 2018/0312613 | A1 | 11/2018 | Townsend | |
| 2020/0062998 | A1 | 2/2020 | Schümann | |
| 2021/0102095 | A1 | 4/2021 | Ranade | |
| 2021/0102097 | A1 | 4/2021 | Ranade | |
| 2021/0277286 | A1* | 9/2021 | Mizobata | C09J 7/29 |
| 2023/0407136 | A1 | 12/2023 | Kugel | |

FOREIGN PATENT DOCUMENTS

| | | | | |
|---|---|---|---|---|
| JP | 05320284 | | 12/1993 | |
| JP | H07133467 | | 5/1995 | |
| JP | 09111193 | A | 4/1997 | |
| JP | 2005028643 | | 2/2005 | |
| WO | 2004087829 | A2 | 10/2004 | |
| WO | WO 2012-043664 | | 4/2012 | |
| WO | 2014078115 | A1 | 5/2014 | |
| WO | WO 2017-052680 | | 3/2017 | |
| WO | 2019157262 | A1 | 8/2019 | |
| WO | 2019157264 | A1 | 8/2019 | |
| WO | 2019157265 | A1 | 8/2019 | |
| WO | 2019164678 | A1 | 8/2019 | |
| WO | WO 2019157264 | * | 8/2019 | C09J 5/04 |
| WO | 2021024204 | A1 | 2/2021 | |

* cited by examiner

THERMAL DEBONDING OF PRIMER-INITIATED CURABLE STRUCTURAL ADHESIVE FILMS

CROSS REFERENCE TO RELATED APPLICATIONS

This application is a national stage filing under 35 U.S.C. 371 of PCT/IB2021/051782, filed Mar. 3, 2021, which claims the benefit of U.S. Application No. 62/986,316, filed Mar. 6, 2020, the disclosure of which is incorporated by reference in its entirety herein.

FIELD OF THE DISCLOSURE

This disclosure relates to a method of reversing structural adhesive bonds by application of heat, where the adhesive bonds comprise structural adhesive films cured by a mechanism of primer-initiated cure.

BACKGROUND OF THE DISCLOSURE

Applicants have previously investigated cure of adhesive films to form structural adhesive bonds, as disclosed in these references: WO 2019/157262 "Film-Initiated Cure of Structural Adhesive Film"; WO 2019/157264 "Primer-Initiated Cure of Structural Adhesive Film"; WO 2019/157265 "Primer-Initiated Cure of Structural Adhesive Film"; and WO 2019/164678 "Core-Sheath Filaments and Methods of Printing an Adhesive"; the disclosures of which are incorporated herein by reference. (Docket Nos. 81407US002, 78901US002, 81371US002, and 82231US002).

The following references may be relevant to the general field of technology of the present disclosure: US 2005/0214497; JPS 6026079; CA 1,301,616; DE 10259457; EP 0140006; EP 0232936; EP 0889105; EP 1800865; GB 1,448,257; JP 09/111193; US 2004/0228998; US 2005/0230960; US 2008/0242764; US 2010/0061823; US 2010/0255239; US 2013/0052460; US 2016/0289513; U.S. Pat. Nos. 3,625,875; 3,639,500; 3,994,764; 3,996,308; 4,170,612; 4,316,000; 4,373,077; 4,452,955; 4,472,231; 4,569,976; 4,945,006; 4,946,529; 5,003,016; 5,106,808; 6,734,249; and WO 2014/078115.

SUMMARY OF THE DISCLOSURE

Briefly, the present disclosure provides methods comprising: a) providing a bound article comprising, in order: a first adherend; a first primer layer; an adhesive layer; optionally a second primer layer; and a second adherend; b) heating the article to a release temperature; and c) separating the first and second adherends such that they are no longer bound together by the adhesive layer. At room temperature, the adhesive layer exhibits an overlap shear of greater than 1.0 MPa (145 psi) or even greater than 3.0 MPa (435 psi), 4.5 MPa (653 psi), or 5.0 MPa (725 psi). However, at release temperature, the adhesive layer exhibits an overlap shear of no more than 0.34 MPa (50 psi) or even no more than 0.28 MPa (40 psi) or 0.21 MPa (30 psi). The release temperature may be a temperature between 100° C. and 150° C.; between 105° C. and 135° C., or between 105° C. and 120° C. In some embodiments, the adhesive layer comprises: i) a first film-forming polymer or oligomer; ii) a cured polymer comprising a polymer of a first species comprising first unsaturated free-radically polymerizable groups; iii) a first transition metal cation; and optionally iv) a quaternary ammonium salt. The first film-forming polymer or oligomer may be a (meth)acrylate polymer or oligomer. The cured polymer may also be a (meth)acrylate polymer or oligomer. The first species may comprise two or more, three or more, or four or more first unsaturated free-radically polymerizable groups. In some embodiments, the first unsaturated free-radically polymerizable groups are (meth)acryloyl groups. In some embodiments, the cured polymer is a peroxide-cured polymer. Additional embodiments of the methods of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this Application:

"common solvents" refers to low molecular weight organic liquids commonly used as solvents by practitioners in the art, which may include aliphatic and alicyclic hydrocarbons (e.g., hexane, heptane, and cyclohexane), aromatic solvents (e.g., benzene, toluene, and xylene), ethers (e.g., diethyl ether, glyme, diglyme, diisopropyl ether, and tetrahydrofuran), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide, N,N-dimethylacetamide, and N-methyl-2-pyrrolidone), halogenated solvents (e.g., methylchloroform, 1,1,2-trichloro-1,2,2-trifluoroethane, trichloroethylene, and trifluorotoluene), and mixtures thereof; providing that "common solvents" excludes species that act as monomers or otherwise as reactants in a given composition;

"directly bound" refers to two materials that are in direct contact with each other and bound together;

"directly applied" refers to application of one material directly to another without intervening materials;

"essentially no" amount of a material in a composition may be substituted with "less than 5 weight percent", "less than 4 weight percent", "less than 3 weight percent", "less than 2 weight percent", "less than 1 weight percent", "less than 0.5 weight percent", "less than 0.1 weight percent", or "none";

"film-forming" means capable of forming a continuous and coherent film, which in some embodiments may result from one or more of solidification, curing, drying, or solvent removal of a melt, solution, suspension, or the like;

"free-standing film" means a film that is solid at normal temperature and pressure (NTP) and has mechanical integrity independent of contact with any supporting material (which excludes, inter alia, liquids, surface coatings dried or cured in situ such as paints or primers, and films without independent mechanical integrity);

"hot melt processable adhesive" means an adhesive comprising essentially no common solvents, which may be hot melt processed under conventional conditions, where hot melt processing includes hot melt blending and extruding;

"(meth)acrylate" includes, separately and collectively, methacrylate and acrylate;

"monomer unit" of a polymer or oligomer is a segment of a polymer or oligomer derived from a single monomer;

"normal temperature and pressure" or "NTP" means a temperature of 20° C. (293.15 K, 68° F.) and an absolute pressure of 1 atm (14.696 psi, 101.325 kPa);

"pendent" functional groups of a polymer or oligomer are functional groups that do not form a part of the backbone of the polymer or oligomer and are not terminal groups of the polymer;

"pressure sensitive adhesive" or "PSA" means materials having the following properties: a) tacky surface, b) the ability to adhere with no more than finger pressure, c) the ability to adhere without activation by any energy source, d) sufficient ability to hold onto the intended adherend, and preferably e) sufficient cohesive strength to be removed cleanly from the adherend; which materials typically meet the Dahlquist criterion of having a storage modulus at 1 Hz and room temperature of less than 0.3 MPa;

"structural adhesive" means an adhesive that binds by irreversible cure, typically with a strength when bound to its intended substrates, measured as stress at break (peak stress) using the overlap shear test described in the Examples herein, of at least 689 kPa (100 psi), in some embodiments at least 1379 kPa (200 psi), and in some embodiments at least 2067 kPa (300 psi); and "unitary" or "unitary article" refer to an article that is a single piece, though it may comprise elements that can be separately named, that is formed from a single piece or aliquot of material without division of that piece or aliquot (such as by extruding, casting, stamping, molding, forging, machining, sculpting, or the like), and that lacks seams or joints between elements.

All scientific and technical terms used herein have meanings commonly used in the art unless otherwise specified.

As used in this specification and the appended claims, past tense verbs such as "coated" and "embossed" are intended to represent structure, and not to limit the process used to obtain the recited structure, unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

DETAILED DESCRIPTION

The present disclosure provides methods of reversing structural-strength adhesive bonds by application of heat, where the adhesive bonds comprise adhesive films cured by a mechanism of primer-initiated cure. The method comprises: a) providing a bound article comprising, in order: a first adherend; a first primer layer; an adhesive layer; optionally a second primer layer; and a second adherend; b) heating the article to a release temperature; and c) separating the first and second adherends such that they are no longer bound together by the adhesive layer. At room temperature, the adhesive layer exhibits an overlap shear of greater than 1.0 MPa (145 psi) or even greater than 4.5 MPa (653 psi). However, at release temperature, the adhesive layer exhibits an overlap shear of no more than 0.34 MPa (50 psi) or even no more than 0.21 MPa (30 psi).

The release temperature is a temperature between 100° C. and 150° C.; or in various embodiments between 100° C. and 145° C.; between 100° C. and 140° C.; between 100° C. and 135° C.; between 100° C. and 130° C.; between 100° C. and 125° C.; between 100° C. and 120° C.; between 105° C. and 150° C.; between 105° C. and 145° C.; between 105° C. and 140° C.; between 105° C. and 135° C.; between 105° C. and 130° C.; between 105° C. and 125° C.; between 105° C. and 120° C.; between 110° C. and 150° C.; between 110° C. and 145° C.; between 110° C. and 140° C.; between 110° C. and 135° C.; between 110° C. and 130° C.; between 110° C. and 125° C.; between 110° C. and 120° C.; between 115° C. and 150° C.; between 115° C. and 145° C.; between 115° C. and 140° C.; between 115° C. and 135° C.; between 115° C. and 130° C.; between 115° C. and 125° C.; or between 115° C. and 120° C.

Suitable adhesive/primer systems may include those disclosed in WO 2019/157264 "Primer-Initiated Cure of Structural Adhesive Film"; WO 2019/157265 "Primer-Initiated Cure of Structural Adhesive Film"; and WO 2019/164678 "Core-Sheath Filaments and Methods of Printing an Adhesive"; the disclosures of which are incorporated herein by reference. (Docket Nos. 78901US002, 81371US002, and 82231US002). Any suitable adhesive layers and cure-initiating primers disclosed therein may be used in the practice of the present invention.

Suitable adhesive/primer systems can provide structural strength bonds which however may be weakened to the point that manual disassembly is possible for purposes such as rework or recycle of the bound substrates.

Any suitable primer which initiates cure of the chosen curable adhesive film may be used in the practice of the present disclosure. Typically, the primers comprise an oxidizing agent, optionally a film-forming oligomer, and optionally a transition metal cation. In some embodiments, the primers comprise a reactive oligomer comprising unsaturated free-radically polymerizable groups; an oxidizing agent; and optionally a transition metal cation. In some embodiments, the primers comprise a reactive oligomer, comprising pendent, unsaturated free-radically polymerizable groups; an oxidizing agent; and optionally a transition metal cation. In some embodiments, the primers comprise a blend of a film-forming oligomer, a reactive species comprising unsaturated free-radically polymerizable groups, an oxidizing agent; and optionally a reducible transition metal cation. In some embodiments, the primers comprise a blend of a film-forming oligomer; an oxidizing agent; and optionally a reducible transition metal cation. In some embodiments, the unsaturated free-radically polymerizable groups are selected from vinyl-containing groups such as (meth)acrylate groups. In some embodiments, the oxidizing agent comprises a peroxide group, such as a hydroperoxide group. In some embodiments, the transition metal cation is a cation of molybdenum, titanium, vanadium, chromium, manganese, iron, cobalt, nickel, copper or zinc. In some embodiments, the transition metal cation is a copper cation, such as Cu(II). In some embodiments, the transition metal cation is an iron cation, such as Fe(II) or Fe(III), such as may be found in Black 11 ($Fe_3O_4$ or $FeO \cdot Fe_2O_3$), Red 102 ($Fe_2O_3$), or Yellow 42 ($FeO(OH) \cdot H_2O$). In some embodiments, the primer additionally comprises a crosslinker comprising two or more or three or more unsaturated free-radically polymerizable groups, such as vinyl-containing groups, such as (meth)acrylate groups, which may be the same or different from any crosslinker in the curable adhesive film. In some embodiments, the crosslinker is a crosslinking monomer. In some embodiments, the crosslinker is an oligomer. In some embodiments, the primer may additionally contain excipients to facilitate transport of oxidizing agents. In some embodiments, common plasticizers may be used as excipients. In some embodiments, plasticizers such as low vapor pressure (at room temperature) plasticizers and/or high boiling point plasticizers may be used. In some embodiments the primer may additionally comprise fillers, such as solid or hollow particles comprising polymer, glass, ceramic, metal or metal oxide materials. The primer is typically applied as a solvent-borne liquid, by any suitable method, which may include brushing, spraying, dipping, and the like. Additional embodiments of the primers of the present disclosure and their use are provided in the Selected Embodiments and the Examples.

Any suitable oxidizing agents may be used in the primer. Suitable oxidizing agents may include organic peroxides, inorganic peroxides or persulfates. Suitable organic peroxides may include hydroperoxides, ketone peroxides, diacyl peroxides, dialkyl peroxides, peroxyketals, peroxyesters and peroxydicarbonates. Suitable organic peroxides may include di-peroxides, which may include di-peroxides comprising the moiety R1—O—O—R2—O—O—R3, with R1 and R3 being independently selected from H, alkyl (e.g. C1 to C6), branched alkyl (e.g. C1 to C6), cycloalkyl (e.g. C5 to C10), alkylaryl (e.g. C7 to C12) or aryl (e.g. C6 to C10) and R2 being selected from alkyl (e.g. (C1 to C6) or branched alkyl (e.g. C1 to C6). Suitable ketone peroxides may include methyl ethyl ketone peroxide, methyl isobutyl ketone peroxide, methyl cyclohexanone peroxide, and cyclohexanone peroxide. Suitable peroxyesters may include alpha-cumylperoxyneodecanoate, t-butyl peroxypivarate, t-butyl peroxyneodecanoate, 2,2,4-trimethylpentylperoxy-2-ethyl hexanoate, t-amylperoxy-2-ethyl hexanoate, t-butylperoxy-2-ethyl hexanoate, di-t-butylperoxy isophthalate, di-t-butyl peroxy hexahydroterephthalate, t-butylperoxy-3,3,5-trimethylhexanoate, t-butylperoxy acetate, t-butylperoxy benzoate and t-butylperoxymaleic acid. Suitable peroxidicarbonates may include di-3-methoxy peroxidicarbonate, di-2-ethylhexyl peroxy-dicarbonate, bis(4-t-butylcyclohexyl)peroxidicarbonate, diisopropyl-1-peroxydicarbonate, di-n-propyl peroxidicarbonate, di-2-ethoxyethyl-peroxidicarbonate, and diallyl peroxidicarbonate. Suitable diacyl peroxides may include acetyl peroxide, benzoyl peroxide, decanoyl peroxide, 3,3,5-trimethylhexanoyl peroxide, 2,4-dichlorobenzoyl peroxide and lauroylperoxide. Suitable dialkyl peroxides may include di-t-butyl peroxide, dicumylperoxide, t-butylcumyl peroxide, 2,5-dimethyl-2,5-di(t-butylperpoxy) hexane, 1,3-bis(t-butylperoxyisopropyl)benzene and 2,5-dimethyl-2,5-di(t-butylperoxy)-3-hexane Suitable peroxyketals may include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane and 4,4-bis(t-butylperoxy)valeric acid-n-butylester. In some embodiments, the organic peroxide is a hydroperoxide, in particular a hydroperoxide comprising the structural moiety R—O—O—H with R being (e.g. C1 to C20) alkyl, (e.g. C3 to C20) branched alkyl, (e.g. C6 to C12) cycloalkyl, (e.g. C7 to C20) alkylaryl or (e.g. C6 to C12) aryl. Suitable organic hydroperoxides may include t-butyl hydroperoxide, t-amyl hydroperoxide, p-diisopropylbenzene hydroperoxide, cumene hydroperoxide, pinane hydroperoxide, p-methane hydroperoxide and 1,1,3,3-tetramethylbutyl hydroperoxide. Suitable oxidizing agents may include peroxodisulfate components and/or peroxodiphosphate components. Suitable examples may include ammonium, sodium, and potassium peroxodisulfate components and/or peroxodiphosphate components Suitable organic peroxides may additionally include t-butyl peroxy ethylhexyl carbonate, t-butyl peroxy trimethylhexanoate, t-butyl peroxy ethylhexanoate, t-amyl peroxy ethylhexanoate, t-octyl peroxy ethylhexanoate, t-amyl peroxy ethylhexyl carbonate, t-butyl peroxy isopropyl carbonate, t-butyl peroxyneodecanoate, t-butyl peroxyisobutyrate, or t-butyl hydroperoxide.

The primer is applied to the surface of the first adherend to be covered by the adhesive layer.

Optionally, one or more secondary primers are applied to the surface of the first adherend before application of the cure-initiating primer. Optionally, one or more secondary primers are applied to the surface of the second adherend before application of the cure-initiating primer. Secondary primers are typically not cure-initiating.

Any suitable curable adhesive films may be used in the practice of the present disclosure. The curable adhesive films are typically pressure sensitive adhesives (PSA's). The curable adhesive films are typically free-standing films. The curable adhesive films are solids at NTP. In some embodiments, the films comprise a blend of a reactive oligomer comprising unsaturated free-radically polymerizable groups; optionally a reducing agent; and optionally a transition metal cation. In some embodiments, the films comprise a blend of a reactive oligomer, comprising pendent, unsaturated free-radically polymerizable groups; optionally a reducing agent; and optionally a transition metal cation. In some embodiments, the films comprise a blend of a film-forming oligomer, a reactive species comprising unsaturated free-radically polymerizable groups; optionally a reducing agent; and optionally a transition metal cation and optionally a quaternary ammonium salt. In some embodiments, the unsaturated free-radically polymerizable groups are selected from vinyl-containing groups such as (meth)acrylate groups. In some embodiments, the oligomer is a poly(meth)acrylate oligomer. In some embodiments the curable adhesive film additionally comprises a crosslinker comprising two or more or three or more unsaturated free-radically polymerizable groups, such as vinyl-containing groups, such as (meth) acrylate groups. In some embodiments, the crosslinker is a crosslinking monomer. In some embodiments, the crosslinker is an oligomer. In some embodiments the curable adhesive film additionally comprises a redox accelerator, such as a quaternary amine. In other embodiments the redox accelerator may be chosen from organic or inorganic chloride ion containing compounds such as amine hydrochlorides or sodium chloride. In some embodiments the curable adhesive film may additionally comprise fillers, such as solid or hollow particles comprising polymer, glass, ceramic, metal or metal oxide materials. Additional embodiments of the curable adhesive films of the present disclosure, tapes comprising same, and their use are provided in the Selected Embodiments and the Examples.

When present, any suitable transition metal cation may be used, including those listed above in relation to the cure-initiating primer.

When present, any suitable reducing agent may be used, including organic and inorganic components and mixtures thereof. Suitable reducing agents may include ascorbic acid components, tertiary amine components, sulfinate components, sulphite components, borane components, (thio)urea components, (thio)barbituric acid components, saccharin, reducing sugars such as dextrose, glucose, and fructose, and metal salts of any of the preceding. In some embodiments, the reducing agent comprises an ascorbic acid moiety. Such reducing agents may include salts or esters of ascorbic acid or may be linked to an ascorbic acid moiety by an ether linkage. Ketals or acetals may additionally be useful. Suitable salts may include alkali metal and earth alkali metal salts like Na, K, Ca and mixtures thereof. Esters of ascorbic acid may include those formed by reacting one or more of the hydroxyl functions of ascorbic acid with a carboxylic acid, in particular C2-C30 carboxylic acids or C12-C22 carboxylic acids. Suitable examples of C2 to C30 carboxylic acids include the fatty acids, like caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. In some embodiments, the reducing agent comprises an ascorbic acid moiety and can be easily dissolved in or mixed with the other components of the film, such as a reducing agent containing a hydrophobic moiety. In other embodiments, the reducing agent may be a tertiary amine such as N,N-dimethyl-p-toluidine, N,N-dimethyl-aminoethyl methacrylate, triethanolamine, methyl 4-dimethylaminobenzoate, ethyl 4-dimethylaminobenzoate, methyldiphenylamine and isoamyl 4-dimethylaminobenzoate. In other embodiments, the reducing agent may be a sodium sulfinate derivative or an organometallic compound.

In some embodiments, the curable adhesive film has an outer surface, i.e., a substrate-facing surface, which includes embossed air bleed channels capable of aiding in escape of air during application of the outer surface to a substrate. The channels, and methods of their production, may be as taught in EP 1800865. Such channels fulfill a unique purpose in the use of the articles of the present disclosure. By allowing escape of trapped air bubbles, air bleed channels may help to improve contact with the primer. Alternately, where an adhesive film or tape has one embossed face and one that is not embossed, the non-embossed face may be placed on a first substrate and the second substrate may then be brought into contact with the embossed face. This approach may be particularly useful where two stiff substrates are to be joined, since it allows air bleed and adaptability to uneven surfaces despite the inflexibility of the substrates.

Upon contact with the cure-initiating primer, the curable adhesive film begins to cure, forming bond with structural adhesive strength.

In some embodiments of the methods described herein, the loss of adhesion at elevated temperature is unusual in that it proceeds by a reversible mechanism. The adhesive may return to 70%, 80%, or even 90% of its strength upon returning to NTP if the substrates are not separated. This may enable debonding of one adherend out of many attached to a substrate without adversely affecting others, such as third, fourth or fifth adherends bound to the first or the second adherend by the same adhesive system (primers and adhesive layers). In addition, this may enable repositioning of a bound adherend by heating to the release temperature, repositioning the adherends relative to each other, and cooling (or allowing to cool) the bound article.

Additional embodiments of this disclosure are recited in the Selected Embodiments and Examples below.

SELECTED EMBODIMENTS

The following embodiments, designated by letter and number, are intended to further illustrate the present disclosure but should not be construed to unduly limit this disclosure.

M1. A method comprising:
- a) providing a bound article comprising, in order:
  - i) a first adherend;
  - ii) a first primer layer;
  - iii) an adhesive layer;
  - iv) optionally a second primer layer; and
  - v) a second adherend;
- b) heating the article to a release temperature; and
- c) separating the first and second adherends such that they are no longer bound together by the adhesive layer;

wherein the release temperature is a temperature between 100° C. and 150° C.;

wherein the adhesive layer exhibits an overlap shear of greater than 1.0 MPa (145 psi) at room temperature, as measured by the Overlap Shear test method described herein; and wherein the adhesive layer exhibits an overlap shear of no more than 0.34 MPa (50 psi) at the release temperature, as measured by the Overlap Shear test method described herein.

M2. The method according to embodiment M1 wherein the release temperature is a temperature between 105° C. and 135° C.

M3. The method according to embodiment M1 wherein the release temperature is a temperature between 105° C. and 120° C.

M4. The method according to any of embodiments M1-M3 wherein the adhesive layer exhibits an overlap shear of greater than 1.5 MPa (218 psi) at room temperature, as measured by the Overlap Shear test method described herein.

M5. The method according to any of embodiments M1-M3 wherein the adhesive layer exhibits an overlap shear of greater than 2.0 MPa (290 psi) at room temperature, as measured by the Overlap Shear test method described herein.

M6. The method according to any of embodiments M1-M3 wherein the adhesive layer exhibits an overlap shear of greater than 2.5 MPa (363 psi) at room temperature, as measured by the Overlap Shear test method described herein.

M7. The method according to any of embodiments M1-M3 wherein the adhesive layer exhibits an overlap shear of greater than 3.0 MPa (435 psi) at room temperature, as measured by the Overlap Shear test method described herein.

M8. The method according to any of embodiments M1-M3 wherein the adhesive layer exhibits an overlap shear of greater than 3.5 MPa (508 psi) at room temperature, as measured by the Overlap Shear test method described herein.

M9. The method according to any of embodiments M1-M3 wherein the adhesive layer exhibits an overlap shear of greater than 4.0 MPa (580 psi) at room temperature, as measured by the Overlap Shear test method described herein.

M10. The method according to any of embodiments M1-M3 wherein the adhesive layer exhibits an overlap shear of greater than 4.5 MPa (653 psi) at room temperature, as measured by the Overlap Shear test method described herein.

M11. The method according to any of embodiments M1-M3 wherein the adhesive layer exhibits an overlap shear of greater than 5.0 MPa (725 psi) at room temperature, as measured by the Overlap Shear test method described herein.

M12. The method according to any of embodiments M1-M3 wherein the adhesive layer exhibits an overlap shear of greater than 5.5 MPa (798 psi) at room temperature, as measured by the Overlap Shear test method described herein.

M13. The method according to any of embodiments M1-M12 wherein the adhesive layer exhibits an overlap shear of no more than 0.31 MPa (45 psi) at the release temperature, as measured by the Overlap Shear test method described herein.

M14. The method according to any of embodiments M1-M12 wherein the adhesive layer exhibits an overlap shear of no more than 0.28 MPa (40 psi) at the release temperature, as measured by the Overlap Shear test method described herein.

M15. The method according to any of embodiments M1-M12 wherein the adhesive layer exhibits an overlap shear of no more than 0.24 MPa (35 psi) at the release temperature, as measured by the Overlap Shear test method described herein.

M16. The method according to any of embodiments M1-M12 wherein the adhesive layer exhibits an overlap shear of no more than 0.21 MPa (30 psi) at the release temperature, as measured by the Overlap Shear test method described herein.

MC1. The method according to any of embodiments M1-M16 wherein the adhesive layer comprises:
- i) a first film-forming polymer or oligomer;
- ii) a cured polymer comprising a polymer of a first species comprising first unsaturated free-radically polymerizable groups;
- iii) a first transition metal cation; and optionally
- iv) a quaternary ammonium salt.

MC2. The method according to embodiment MC1 wherein the first film-forming polymer or oligomer is a (meth)acrylate polymer or oligomer.

MC3. The method according to any of embodiments MC1-MC2 wherein the cured polymer is a (meth) acrylate polymer or oligomer.

MC4. The method according to any of embodiments MC1-MC3 wherein the first species comprises two or more first unsaturated free-radically polymerizable groups.

MC5. The method according to any of embodiments MC1-MC3 wherein the first species comprises three or more first unsaturated free-radically polymerizable groups.

MC6. The method according to any of embodiments MC1-MC3 wherein the first species comprises four or more first unsaturated free-radically polymerizable groups.

MC7. The method according to any of embodiments MC1-MC6 wherein first unsaturated free-radically polymerizable groups are (meth)acryloyl groups.

MC8. The method according to any of embodiments MC1-MC7 wherein the cured polymer is a peroxide-cured polymer.

MC9. The method according to any of embodiments MC1-MC8 wherein the adhesive layer comprises a quaternary ammonium salt.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

All parts, percentages, ratios, etc. in the examples and the rest of the specification are by weight, unless noted otherwise. The following abbreviations may be used: m=meters; cm=centimeters; mm=millimeters; um=micrometers; ft=feet; in=inch; RPM=revolutions per minute; kg=kilograms; oz=ounces; lb=pounds; Pa=Pascals; sec=seconds; min=minutes; hr=hours; and RH=relative humidity. The terms “weight %”, “% by weight”, and “wt %” are used interchangeably.

Materials

| Designation | Description |
| --- | --- |
| IPA | Isopropyl alcohol |
| MEK | Methylethylketone |
| acetone | acetone |
| Copolymer 1 | Polymer composition made as described below |
| M1 | An octyl acrylate isomer blend prepared as described in Example 1 of U.S. Pat. No. 9,102,774. |
| AA | Acrylic acid available from Sigma Aldrich, St. Louis, MO. |
| Photoinitiator-1 | 2,2-dimethoxy-1,2-diphenylethan-l-one available under the trade designation IRGACURE 651 from BASF Corporation, Florham Park, NJ |
| Antioxidant-1 | Octadecyl-[3-(3,5-di-tert-butyl-4-hydroxyphenyl)propionate] available under the trade designation IRGANOX 1076 from BASF Corporation, Florham Park, NJ |
| HDDA | 1,6-Hexanediol diacrylate available from Sigma Aldrich, St. Louis, MO. |
| TBEC | tert-Butylperoxy 2-ethylhexyl carbonate available under the trade designation LUPEROX TBEC from Arkema Inc., King of Prussia, PA. 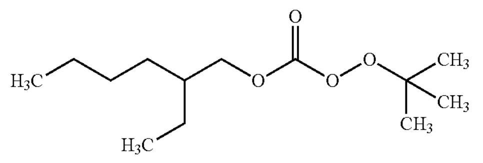 [SMILES: CCCCC(CC)COC(=O)OOC(C)(C)C] |

-continued

| Materials | |
|---|---|
| BTEAC | Benzyltriethylammonium chloride available from Lindau Chemicals, Inc., Columbia, SC. |
| M410 | Ditrimethylolpropane tetraacrylate (DTMPTA) available under the trade designation MIRAMER M410 from Miwon Specialty Chemical Co., Ltd., Exton, PA. 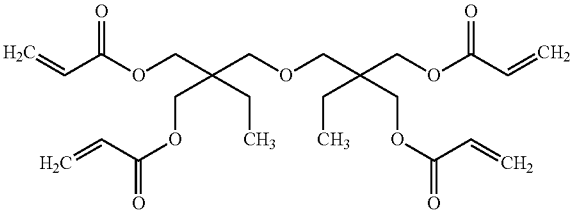 [SMILES: C=CC(=O)OCC(CC)(COCC(CC)(COC(=O)C=C)COC(=O)C=C)COC(=O)C=C] |
| UPUV | 3M ™ VHB ™ Universal Primer UV from 3M Company, St. Paul, MN, comprising 5% solids including a film-forming polymer. |
| Cu2EHA | Copper (II) 2-ethylhexanoate |
| 468MP | Adhesive PSA transfer tape available as 3M ™ Adhesive Transfer Tape 468MP from 3M Company, St. Paul, MN |
| 4941 | Acrylic foam PSA tape available as 3M ™ VHB ™ Tape 4941 from 3M Company, St. Paul, MN |

Synthesis of Copolymer 1

This material was prepared as described in Synthesis Example S1 of US 2013/0184394 A1 except that the pre-adhesive composition was as follows: 90 parts M1, 10 parts AA, 0.15 parts of Photoinitiator-1, 0.12 parts Cu2EHA, 0.4 parts Antioxidant-1 and 0.001 parts HDDA branching monomer/crosslinker.

Compounding of BTEAC Dispersion

A masterbatch premix was prepared by mixing 2640 g of BTEAC and 9360 g of M410 using a Cowles blade Cowles mixer (DISPERMAT CN-10, BYK-Gardner, Columbia, MD, USA) for 30 minutes until uniform. The mixed material was transferred to the HCPS-¼ Immersion Mill (Hockmeyer Equipment Corporation, Elizabeth City, NC, USA) fitted with 0.50 mm wedge-wire loaded with approximately 550 grams of 1.0 mm yttrium-stabilized zirconia mill media (Torayceram, Toray Industries, Inc). The mill was operated at approximately 40 Hz; and the slurry temperature was maintained around 80-85° C. during milling using thermostated bath/immersion circulator (HAAKE P1-C41P with a Phoenix II controller, ThermoFisher Scientific, NH, USA). The material was milled for 2 hours to a D90 of 15.74 micrometers PSD. Particle size was measured as described in the test methods below.

Hotmelt Compounding of PSA Adhesive Tape

A 30 mm diameter co-rotating twin screw extruder, available as "ZSK-30" from Werner & Pfleiderer, Ramsey, N.J. was used to prepare a pressure sensitive adhesive coated tape. The twin screw extruder had 12 zones, each corresponding to one twelfth of the length of the screw, and a length to diameter ratio of 36:1. The twin screw extruder was operated at 300 rpm and temperature was 250° F. (121.1° C.) in Zones 1-7, and 220° F. (104.4° C.) in Zones 8-12. Copolymer 1 in pouches was fed into a 2 inch (51 mm) Single Packer Extruder commercially available from Bonnot, Uniontown, Ohio. The single Packer Extruder masticated the polymer and fed it into zone 2 of the twin screw extruder at a rate of 52.1 grams/minute. BTEAC Dispersion was fed in a split stream at a rate of 3.05 grams/minute into zone 4, a rate of 9.88 grams/minute into zone 7, and a rate of 11.29 grams/minute into zone 9 of the extruder from a peristaltic pump (505DU available from Watson Marlow Ltd., Cornwall, England) into zones 4, and 9 and a second peristaltic pump (956-0000 head on a IP56 pump available from Thermo Scientific, Barrington, IL) into zones 7 and 9. The melt mixture passed from the extruder into a polymer melt pump set at 280° F. (137.8° C.) (commercially available as "PEP-II 3 CC/REV" from Zenith Pumps of Monroe, NC) which pumped it at a rate of 84 $cm^3$/minute into a rotary rod die set to 280° F. (137.8° C.). The melt mixture was coated onto a silicone-coated polycoated kraft paper release liner as a continuous sheet of pressure sensitive adhesive having about 5 mil (0.13 mm) thickness. The coated PSA transfer tape thus formed was used as described in Examples 1-3 below.

Test Methods

Particle Size Measurement

Particle size of the BTEAC Dispersion was measured by laser diffraction using Horiba LA-950V (Horiba, Kyoto, Japan). The following refractive index values were used for the calculation: MEK (1.3791) and BTEAC (1.4790). The second differential method was used for smoothing based on 150 iterations. The dispersion was diluted to approximately 1 weight percent solids with MEK. The diluted sample was then added to the measurement cell which was filled with MEK until the transmittance was between the recommended levels of 85-95%. The D90 is the maximum particle size below which 90% of the sample volume exists.

Overlap Shear Tests 1 inch by 4 inch by 0.064 inch (2.5 cm by 10 cm by 1.6 mm) aluminum substrates were washed with MEK, 50/50 water/IPA solution and acetone followed by air-drying. Primer was applied as described. A 1 inch by 1 inch (2.5 cm by 2.5 cm) portion of PSA transfer tape was applied to the terminal end over the top of the primer. The release liner was removed, and a second primed aluminum substrate was applied to the sample adhesive, thus closing the bond (total bond area 1 inch by 1 inch (2.5 cm by 2.5 cm) and forming a test assembly. The test assembly was wet out by rolling with an automated 15 lb (6.8 kg) roller across the bond 3 times at 24 inch/minute. The bonded test assembly dwelled as described prior to testing.

A dynamic overlap shear test was performed at dictated temperature using a Sintech 5 Tensile Tester (MTS, Eden Prairie, Minn.) equipped with variable temperature oven. Test specimens were loaded into the grips inside the oven and the crosshead was operated at 0.1 inch/minute, loading the specimen to failure. Peak stress was recorded in units of pounds force per square inch (PSI).

ASTM Designation: D1002. Data was recorded in pounds/square inch

EXAMPLES

Example 1

Cure-initiating primer was made by mixing 0.80 g TBEC into 20.0 g UPUV in a 40 mL glass vial. The primer was applied to both substrates by wiping the surface gently with 3 passes from a small KimWipe that had been dipped in the primer mixture described. Test specimens for Overlap Shear Tests were assembled as described above and allowed to dwell at 71° F. (22° C.) for 24 hours prior to testing.

Example 2

Test specimens for Overlap Shear Tests were prepared as in Example 1 except that testing occurred after 24 hours at 120° F. (48.9° C.).

Example 3

Test specimens for Overlap Shear Tests were prepared as in Example 1 except that testing occurred after 7 days at 71° F. (22° C.).

Comparative Example 1

Test specimens for Overlap Shear Tests were prepared as in Example 1 except that 4681MP was used as the adhesive layer and was applied to a clean substrate without application of any primer. Testing occurred after 24 hours at 71° F. (22° C.).

Comparative Example 2

Test specimens for Overlap Shear Tests were prepared as in Example 1 except that 4941 was used as the adhesive layer and was applied to a clean substrate without application of any primer. Testing occurred after 24 hours at 71° F. (22° C.).

Comparative Example 3

Prepared as in Example 1 except that 4941 was used and applied primer was UPUV. Test specimens for Overlap Shear Tests were prepared as in Example 1 except that 4941 was used as the adhesive layer and the primer was non-cure initiating primer UPUV. Testing occurred after 24 hours at 71° F. (22° C.).

Comparative Example 4

Prepared as in Example 1 except that 4941 was used. For the purposes of producing a control experiment, the cure initiating primer was used, although it is not expected to initiate any cure in the 4941 tape. Testing occurred after 24 hours at 71° F. (22° C.).

Comparative Example 5

Prepared as in Example 1 except that 4941 was used. UPUV primer was used on one substrate and the cure initiating primer was used on the other. Testing occurred after 24 hours at 71° F. (22° C.).

TABLE 1a

| Overlap Shear Adhesion Measured by Peak Stress (lbf/square inch) as a function of temperature (° F.) | | | | | | | | |
|---|---|---|---|---|---|---|---|---|
| Pull Temp (° F.) | Ex 1 | Ex 2 | Ex 3 | CEx 1 | CEx 2 | CEx 3 | CEx 4 | CEx 5 |
| 71 | 468 | 811 | 801 | 115 | 104 | 112 | 112 | 112 |
| 100 | 380 | 654 | 517 | 68 | NT | NT | NT | NT |
| 150 | 264 | 390 | 302 | 78 | 60 | 36 | 48 | 34 |
| 200 | 100 | 129 | 108 | 68 | 21 | 18 | 20 | 21 |
| 250 | 27 | 35 | 29 | 21 | NT | NT | NT | NT |
| 300 | 12 | 13 | 18 | 21 | NT | NT | NT | NT |

NT = Not Tested

TABLE 1b

| Overlap Shear Adhesion Measured by Peak Stress (MPa) as a function of temperature (° C.) | | | | | | | | |
|---|---|---|---|---|---|---|---|---|
| Pull Temp (° C.) | Ex 1 | Ex 2 | Ex 3 | CEx 1 | CEx 2 | CEx 3 | CEx 4 | CEx 5 |
| 22 | 3.23 | 5.59 | 5.52 | 0.79 | 0.72 | 0.77 | 0.77 | 0.77 |
| 38 | 2.62 | 4.51 | 3.56 | 0.47 | NT | NT | NT | NT |
| 66 | 1.82 | 2.69 | 2.08 | 0.54 | 0.41 | 0.25 | 0.33 | 0.23 |
| 93 | 0.69 | 0.89 | 0.74 | 0.47 | 0.14 | 0.12 | 0.14 | 0.14 |
| 121 | 0.19 | 0.24 | 0.20 | 0.14 | NT | NT | NT | NT |
| 149 | 0.08 | 0.09 | 0.12 | 0.14 | NT | NT | NT | NT |

NT = Not Tested

Adhesive separation or "pop-off" was observed at elevated temperatures. At low temperatures, a mixture of adhesive and cohesive separation was observed.

It can be seen that the adhesives according to the present disclosure can provide structural strength bonds which however may be weakened to the point that manual disassembly is possible for purposes such as rework or recycle of the bound substrates.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method comprising:
- a) providing a bound article comprising, in order:
  - i) a first adherend;
  - ii) a first primer layer;
  - iii) an adhesive layer;
  - iv) optionally a second primer layer; and
  - v) a second adherend;
- b) heating the article to a release temperature; and
- c) separating the first and second adherends such that they are no longer bound together by the adhesive layer;

wherein the release temperature is a temperature between 100° C. and 150° C.;

wherein the adhesive layer exhibits an overlap shear of greater than 1.0 MPa (145 psi) at room temperature, as measured by the Overlap Shear test method described herein; and wherein the adhesive layer exhibits an overlap shear of no more than 0.34 MPa (50 psi) at the release temperature, as measured by the Overlap Shear test method described herein.

2. The method according to claim 1, wherein the release temperature is a temperature between 105° C. and 135° C.

3. The method according to claim 1, wherein the release temperature is a temperature between 105° C. and 120° C.

4. The method according to claim 1, wherein the adhesive layer exhibits an overlap shear of greater than 3.0 MPa (435 psi) at room temperature, as measured by the Overlap Shear test method described herein.

5. The method according to claim 1, wherein the adhesive layer exhibits an overlap shear of greater than 5.0 MPa (725 psi) at room temperature, as measured by the Overlap Shear test method described herein.

6. The method according to claim 1, wherein the adhesive layer exhibits an overlap shear of no more than 0.28 MPa (40 psi) at the release temperature, as measured by the Overlap Shear test method described herein.

7. The method according to claim 1, wherein the adhesive layer comprises:

i) a first film-forming polymer or oligomer;

ii) a cured polymer comprising a polymer of a first species comprising first unsaturated free-radically polymerizable groups;

iii) a first transition metal cation; and optionally iv) a quaternary ammonium salt.

8. The method according to claim 7, wherein the first film-forming polymer or oligomer is a (meth) acrylate polymer or oligomer.

9. The method according to claim 7, wherein the cured polymer is a (meth)acrylate polymer or oligomer.

10. The method according to claim 7, wherein the first species comprises two or more first unsaturated free-radically polymerizable groups.

11. The method according to claim 7, wherein the first species comprises three or more or four or more first unsaturated free-radically polymerizable groups.

12. The method according to claim 7, wherein the first film-forming polymer or oligomer is not a polyurethane polymer.

13. The method according to claim 7, wherein the first unsaturated free-radically polymerizable groups are (meth) acryloyl groups.

14. The method according to claim 7, wherein the cured polymer is a peroxide-cured polymer.

15. The method according to claim 7, wherein the adhesive layer comprises a quaternary ammonium salt.

16. The method according to claim 7, wherein the first primer layer comprises a cure-initiating primer.

17. The method according to claim 7, wherein the first primer layer comprises an oxidizing agent.

18. The method according to claim 1, wherein the first primer layer comprises a cure-initiating primer.

19. The method according to claim 18, wherein the adhesive layer is prepared from a curable adhesive film cured by contact with the cure-initiating primer.

20. The method according to claim 1, wherein the first primer layer comprises an oxidizing agent.

* * * * *